(12) United States Patent
Lofstrom et al.

(10) Patent No.: US 10,730,201 B2
(45) Date of Patent: Aug. 4, 2020

(54) BLADE CHAMFER TOOLS

(71) Applicant: Sikorsky Aircraft Corporation, Stratford, CT (US)

(72) Inventors: Sven R. Lofstrom, Irving, TX (US); Ryan Lehto, Crowley, TX (US); Joshua Richards, Fort Worth, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/283,956

(22) Filed: Oct. 3, 2016

(65) Prior Publication Data

US 2018/0093334 A1  Apr. 5, 2018

(51) Int. Cl.
*B27C 5/10* (2006.01)
*B23C 3/12* (2006.01)

(52) U.S. Cl.
CPC .......... *B27C 5/10* (2013.01); *B23C 3/12* (2013.01); *B23C 2215/045* (2013.01); *B23C 2220/16* (2013.01)

(58) Field of Classification Search
CPC .... B27C 5/00; B27C 5/04; B27C 5/02; B27C 5/026; B27C 5/08; B27C 5/12; B23C 3/126; B23C 3/222; B25B 11/00; B25B 11/02; B23Q 3/00; B23Q 3/06; B23Q 3/067; B23Q 3/154; B23Q 9/0007; B23Q 9/0014; B23Q 9/0042; Y10T 409/306216; Y10T 409/306384; B27F 1/00; B27F 1/10; B27F 1/12; B27F 1/14; B27B 33/20; B27B 5/04

USPC .................... 269/291, 309–310, 37
See application file for complete search history.

(56) References Cited

U.S. PATENT DOCUMENTS

| | | | | | |
|---|---|---|---|---|---|
| 1,566,824 | A | * | 12/1925 | Carter | B27C 5/10 144/134.1 |
| 2,630,151 | A | * | 3/1953 | Turnbull | B23Q 9/0014 144/136.1 |
| 2,702,569 | A | * | 2/1955 | Yelle | B23Q 9/0014 144/136.95 |
| 2,920,663 | A | * | 1/1960 | March | B27C 5/00 144/126 |
| 3,212,541 | A | * | 10/1965 | Burrows | B23C 3/126 144/134.1 |
| 3,241,453 | A | * | 3/1966 | Baldwin | B23C 3/126 144/126 |
| 3,454,056 | A | * | 7/1969 | Pahlck | B23Q 9/0014 83/483 |
| 3,543,816 | A | * | 12/1970 | Thomas | B23Q 9/0014 30/372 |
| 3,628,579 | A | * | 12/1971 | Roche | B23Q 9/0028 144/134.2 |
| 3,893,372 | A | * | 7/1975 | Strakeljahn | B23C 3/126 144/136.95 |

(Continued)

*Primary Examiner* — Shelley M Self
*Assistant Examiner* — Smith Oberto Bapthelus
(74) *Attorney, Agent, or Firm* — Cantor Colburn LLP

(57) ABSTRACT

A tool for machining chamfers includes a tool body defining a first reference and a second reference configured for proper positioning of the tool body on a workpiece. A router port is defined through the tool body to provide access to the workpiece for a router. A router attachment proximate the router port is configured to position a router mounted to the router attachment for machining a chamfer in the workpiece with reference to the first and second references.

9 Claims, 3 Drawing Sheets

(56) References Cited

U.S. PATENT DOCUMENTS

| | | | | |
|---|---|---|---|---|
| 3,913,447 A * | 10/1975 | Roche | | B23C 3/126 144/134.2 |
| 3,955,607 A * | 5/1976 | Roche | | B27C 5/10 144/253.4 |
| 4,112,987 A * | 9/1978 | Pachnik | | B23Q 1/4871 144/154.5 |
| 4,155,383 A * | 5/1979 | Welliver | | B23Q 9/0092 144/154.5 |
| 4,273,483 A * | 6/1981 | Mendicino | | B27C 5/10 144/136.1 |
| 4,281,694 A * | 8/1981 | Gorman | | B23Q 9/00 144/136.95 |
| 4,290,464 A * | 9/1981 | Marsan | | B23Q 9/0028 144/136.95 |
| 4,299,263 A * | 11/1981 | Skinner | | B23Q 1/48 144/144.1 |
| 4,333,288 A * | 6/1982 | Coombs | | A47B 13/083 144/346 |
| 4,335,512 A * | 6/1982 | Sheps | | B23Q 9/0014 30/376 |
| 4,353,672 A * | 10/1982 | Smith | | B23Q 1/4809 144/144.1 |
| 4,655,653 A * | 4/1987 | Hall | | B23Q 9/0028 409/182 |
| 4,718,468 A * | 1/1988 | Cowman | | B27C 5/10 144/136.95 |
| 4,735,531 A * | 4/1988 | Boerckel | | B23Q 1/621 144/136.95 |
| 4,742,856 A * | 5/1988 | Hehr | | B27C 5/10 144/136.95 |
| 4,881,857 A * | 11/1989 | Tanaka | | B23C 3/126 409/138 |
| 4,890,657 A * | 1/1990 | Shelhorse | | B23D 45/024 144/134.1 |
| 4,914,872 A | 4/1990 | Snyder et al. | | |
| 4,964,765 A * | 10/1990 | Kishi | | B23B 51/10 144/117.3 |
| 4,977,938 A * | 12/1990 | Greeson | | B23Q 9/0035 144/136.95 |
| 4,988,245 A * | 1/1991 | Fukuda | | B23C 3/126 144/136.95 |
| 5,004,385 A * | 4/1991 | Kishi | | B23C 3/126 144/154.5 |
| 5,013,195 A * | 5/1991 | Strazar | | B23Q 35/102 144/154.5 |
| 5,013,196 A * | 5/1991 | Friegang | | B23Q 35/102 144/154.5 |
| 5,024,257 A * | 6/1991 | Lloyd | | B27C 5/02 144/1.1 |
| 5,028,179 A * | 7/1991 | Grasset | | B23C 3/126 144/154.5 |
| 5,044,843 A * | 9/1991 | Velepec | | B23C 3/126 144/145.3 |
| 5,094,279 A * | 3/1992 | Dickey | | B23Q 9/0078 144/135.2 |
| 5,123,463 A * | 6/1992 | Grisley | | B23Q 35/20 144/144.1 |
| 5,148,730 A * | 9/1992 | McCaw | | B23Q 9/0042 33/403 |
| 5,197,191 A | 3/1993 | Dunkman et al. | | |
| 5,215,134 A * | 6/1993 | Gudeman | | B23Q 9/0042 144/137 |
| 5,284,406 A | 2/1994 | Mueller et al. | | |
| 5,383,503 A * | 1/1995 | Johnson | | B23Q 35/102 144/144.51 |
| 5,423,642 A * | 6/1995 | Heck | | B23C 3/12 144/136.8 |
| 5,451,123 A | 9/1995 | Fertitta, Jr. | | |
| 5,492,160 A * | 2/1996 | McCracken | | B23Q 9/0085 144/144.51 |
| 5,772,368 A * | 6/1998 | Posh | | B23Q 9/0085 144/136.95 |
| 5,778,949 A * | 7/1998 | Draves | | B23Q 9/0021 144/136.95 |
| 5,823,239 A * | 10/1998 | Smith | | B27C 5/02 144/135.2 |
| 6,070,626 A * | 6/2000 | Tully | | B23Q 9/0028 144/137 |
| 6,374,878 B1 * | 4/2002 | Mastley | | B23Q 9/0028 144/134.1 |
| 7,111,655 B1 * | 9/2006 | Hall | | B27C 5/04 144/286.5 |
| 7,337,812 B2 * | 3/2008 | Williams | | B27C 5/10 144/136.95 |
| 8,016,005 B1 * | 9/2011 | Weinstein | | B23Q 9/0042 144/144.1 |
| 8,740,520 B2 | 6/2014 | Jeon et al. | | |
| 9,090,027 B2 * | 7/2015 | Sutton | | B29C 70/545 |
| 2002/0168241 A1 * | 11/2002 | David | | B23C 1/20 409/178 |
| 2004/0253068 A1 * | 12/2004 | Gerhardt | | B27C 5/10 409/182 |
| 2005/0236069 A1 * | 10/2005 | O'Brien | | B27C 5/10 144/144.1 |
| 2005/0268897 A1 * | 12/2005 | Harris | | B23Q 9/0042 125/12 |
| 2009/0188587 A1 * | 7/2009 | Geisel | | B27C 5/10 144/371 |
| 2013/0167337 A1 | 7/2013 | Dupouy et al. | | |
| 2014/0283386 A1 * | 9/2014 | Pirro | | B25B 11/02 29/897.2 |
| 2014/0363251 A1 * | 12/2014 | Dieckilman | | B23C 3/126 409/179 |
| 2015/0034210 A1 * | 2/2015 | Kieffer, Jr. | | B27C 5/10 144/135.4 |
| 2015/0300317 A1 * | 10/2015 | Altmikus | | F03D 1/0633 416/235 |
| 2016/0167141 A1 * | 6/2016 | Dauner | | B23C 3/12 409/137 |
| 2016/0361832 A1 * | 12/2016 | Brisson | | B26F 1/3806 |
| 2018/0093334 A1 * | 4/2018 | Lofstrom | | B23C 3/126 |

* cited by examiner bodyBLADE CHAMFER TOOLS

BACKGROUND OF THE INVENTION

1. Field of the Invention

The present disclosure relates to tools for machining, and more particularly to tools for machining chamfers and the like.

2. Description of Related Art

Conventional manufacturing processes for production of blades, e.g., rotorcraft blades, depend of 5-axis machines. A 5-axis machine can be used, for example, to machine a chamfer on a root end of a main rotor blade for a helicopter. The 5-axis machines rely on reference features built into the blades for proper positioning of the cuts. However, during a repair or overhaul process, these reference features may be absent.

The conventional techniques have been considered satisfactory for their intended purpose. However, there is an ever present need for improved tools for chamfering and the like. This disclosure provides a solution for this problem.

SUMMARY OF THE INVENTION

A tool for machining chamfers includes a tool body defining a first reference and a second reference configured for proper positioning of the tool body on a workpiece. A router port is defined through the tool body to provide access to the workpiece for a router. A router attachment proximate the router port is configured to position a router mounted to the router attachment for machining a chamfer in the workpiece with reference to the first and second references.

The first and second references can be configured to mount the tool body to a workpiece. Each of the first and second references can include a bolt, spaced apart from one another, wherein the bolts are configured to mount the tool body to a workpiece with the router attachment positioned for correct placement of the chamfer in the workpiece. The first and second references can define a longitudinal workpiece axis.

The router attachment can include a pair of rails spaced apart across the router port. The rails are configured to mount a router to the tool body restricting all degrees of freedom except for a transverse translation relative to the work piece and tool body. The rails can be obliquely angled relative to the longitudinal axis to position a router to form a chamfer with an acute angle. Each rail can form an inward facing L-track configured for mounting a router to the rails by sliding the router into an end of the L-tracks.

A step gage configured for referencing router height can be removably mounted to the tool body. The step gage can include three reference steps, each configured for a different chamfer depth relative to the tool body.

Multiple routers can be used, or a single router can be adjusted to make multiple passes. For example, three routers can be included, each being configured for mounting to the router attachment. Each router can have a different set height for cutting a different chamfer depth relative to the tool body.

A method of machining a chamfer includes mounting a tool body to a workpiece using at least two references to positively position the tool body relative to the workpiece. A router is mounted to the tool body, with a router bit extending through a router port defined through the tool body. The router is slid along the tool body with the router forming a chamfer in the workpiece.

The chamfer can be formed at an acute angle relative to a longitudinal axis of the workpiece. The chamfer can be formed in a laminate substrate of the workpiece.

The router can form a chamfer in the workpiece to a first depth, and the method can include forming the chamfer to successively greater depths using one or more routers with successively lower router heights relative to the tool body. The router can be a first router that forms the chamfer to the first depth, and the method can include removing the first router from the tool body, mounting a second router to the tool body, and forming the chamfer to a second depth using the second router with a lower router height than the first router. The method can include removing the second router from the tool body, mounting a third router to the tool body, and forming the chamfer to a third depth using the third router with a lower router height than the second router.

The chamfer can be a first chamfer and the method can include removing the tool body from the workpiece, flipping the workpiece and mounting the tool body to a side of the workpiece opposite the first chamfer, and sliding the router along the tool body with the router forming a second chamfer in the workpiece opposite the first chamfer. The second chamfer can be formed to successively greater depths using one or more routers with successively lower router heights as described above for the first chamfer.

The workpiece can include a rotor blade for a rotorcraft, wherein mounting the tool body to the workpiece includes bolting the tool body to the rotor blade at a root thereof using a first bolt, and bolting the tool body to the blade root at a slotted aperture in the tool body. Forming a chamfer in the workpiece can include repairing a workpiece that is the rotor blade wherein references have been trimmed off of the rotor blade being repaired.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
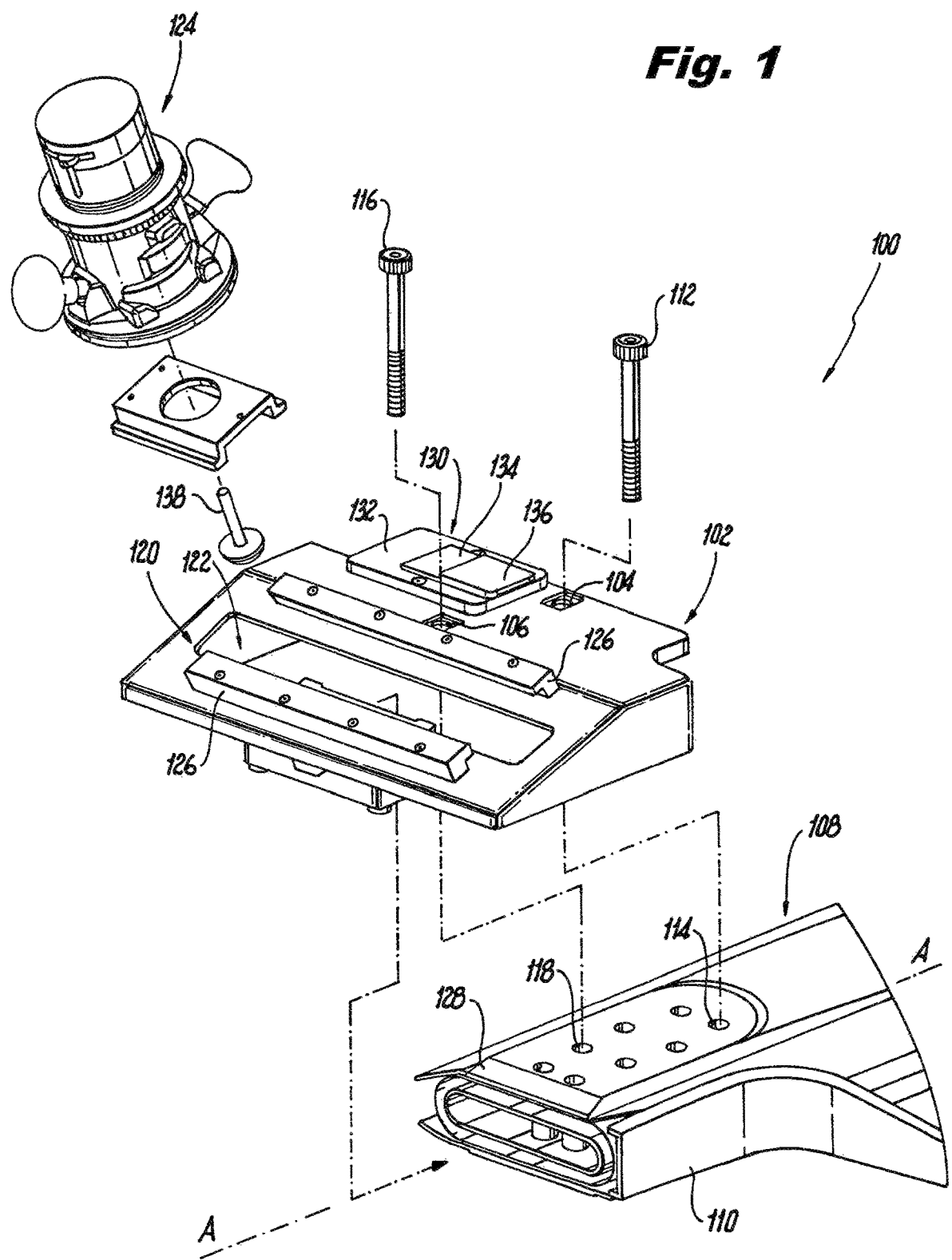
FIG. 1 is an exploded perspective view of an exemplary embodiment of a tool constructed in accordance with the present disclosure, showing the rotor blade and router exploded away from the tool.

Reference will now be made to the drawings wherein like reference numerals identify similar structural features or aspects of the subject disclosure. For purposes of explanation and illustration, and not limitation, a partial view of an exemplary embodiment of a tool in accordance with the disclosure is shown in FIG. 1 and is designated generally by reference character 100. Other embodiments of tools in accordance with the disclosure, or aspects thereof, are provided in FIGS. 2-4, as will be described. The systems and methods described herein can be used to efficiently, accurately, and consistently machine chamfers into workpieces such as main rotor blades or the like, even when manufacturing, wear or use has partially or completely removed reference features from the blades.

The tool 100 for machining chamfers includes a tool body 102 defining a first reference, i.e. bore 104, and a second reference, i.e., slotted bore 106, configured for proper positioning of the tool body 102 on a workpiece 108. Each of the first and second references can include a respective bolt 112 and 116. The workpiece 108 can include a rotor blade for a rotorcraft. Mounting the tool body 102 to the workpiece 108 includes bolting the tool body to the rotor blade at a root 110 thereof using a first bolt 112 passing through bore 104 and circular bore 114, and bolting the tool body 102 to the blade root 110 using a bolt 116 passing through slotted bore 106 and slotted aperture 118 in the blade root 110. This constraint allows for tool body 102 to be mounted only in a single, correct position on workpiece 108.

The first and second references are configured to mount the tool body 102 to a workpiece 108 for proper positioning of a machined chamfer on the workpiece 108. The first and second references define, or are in correct position relative to, a longitudinal workpiece axis A. Bolts 112 and 116 are spaced apart from one another along the direction of workpiece axis A, as are bores 104 and slotted bore 106, for mounting the tool body 102 to workpiece 108 with router attachment 120 positioned for correct placement of the chamfer in the workpiece 108.

Figure 2:
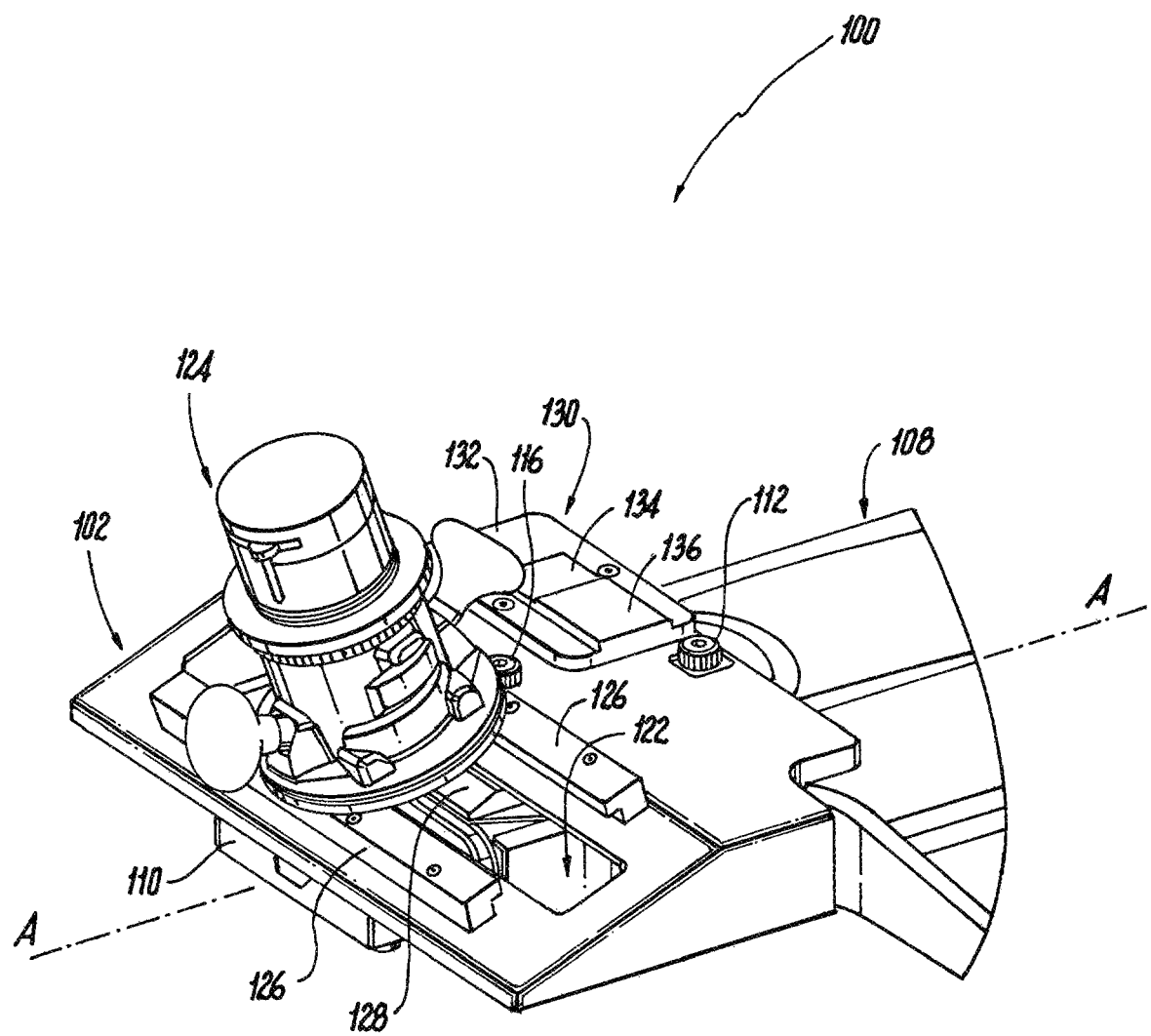
FIG. 2 is a perspective view of the tool of FIG. 1, showing the tool and router assembled onto the rotor blade.
Figure 3:
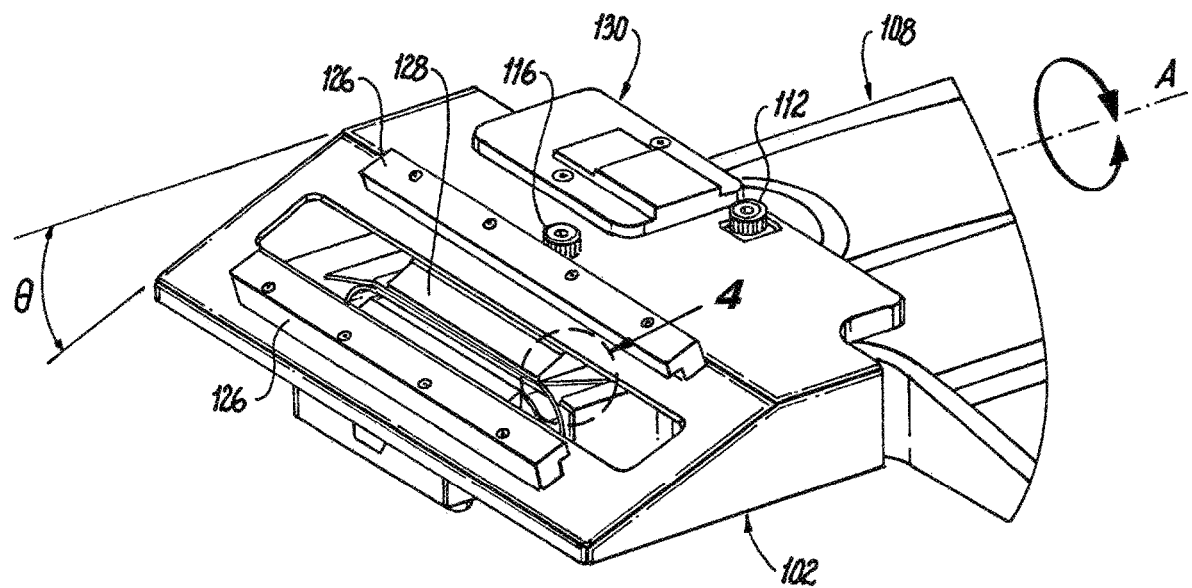
FIG. 3 is a perspective view of the tool of FIG. 1, showing the tool with the router removed, and schematically indicating the portion of the rotor blade to be chamfered.
Figure 4:
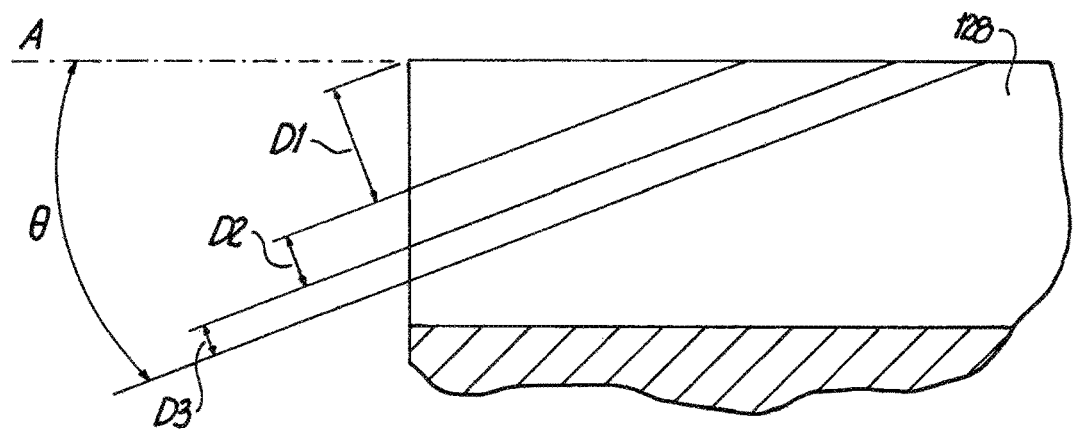
FIG. 4 is a schematic elevation view of the blade of FIG. 3, showing the cutting depths for forming the complete chamfer.

A router port 122 is defined through the tool body 102 to provide access to the workpiece 108 for a router 124. The router attachment 120 proximate the router port 122 is configured to position the router 124 so router 124 is properly positioned for machining a chamfer in the workpiece 108 with reference to the first and second references. The router attachment 120 includes a pair of rails 126 spaced apart from one another across the router port 122. The rails 126 are configured to mount the router 124 to the tool body 102 so that router 124 can slide along the rails 126 to machine the chamfer. As shown in FIG. 3, the rails 126 are obliquely angled relative to the longitudinal axis A at angle θ, to position the router 124 to form the chamfer with an acute angle θ relative to the longitudinal axis, as indicated in FIG. 4. Each rail 126 forms an inward facing L-track configured for mounting router 124 to the rails 126 by sliding the router 124 into an end of the L-tracks. FIG. 2 shows tool body 102 mounted to workpiece 108, and router 124 mounted to tool body 102 for forming chamfer 128.

Referring again to FIG. 1, a step gage 130 configured as a standard for referencing three different router heights is removably mounted to the tool body 102. The step gage 130 includes three reference steps 132, 134, and 136, each configured for a different chamfer depth relative to the tool body. Three routers 124 can be included, each being configured for mounting to the router attachment 120. Each router 124 can have a different set height for cutting a different chamfer depth relative to the tool body 102, and step gage 130 can be used to verify the correct router is being mounted to rails 126 before initiating a cut in workpiece 108.

A method of machining a chamfer includes mounting a tool body, e.g., tool body 102, to a workpiece, e.g., workpiece 108, using at least two references to positively position the tool body relative to the workpiece. A router, e.g. router 124, is mounted to the tool body, with a router bit, e.g., a router bit 138 of router 124 in FIG. 1, extending through a router port, e.g., router port 122, defined through the tool body. The router bit 138 can be diamond coated, for example, for cutting chamfers in composite laminates. The router is slid along the tool body with the router forming a chamfer, e.g., chamfer 128 in FIGS. 3 and 4, in the workpiece.

The chamfer can be formed at an acute angle, e.g., angle θ shown in FIGS. 3 and 4, relative to a longitudinal axis of the workpiece. The chamfer can be formed in a laminate substrate of the workpiece. While shown and described herein in the exemplary context of chamfering a laminate substrate, those skilled in the art will readily appreciate that any other suitable substrate or material, e.g. generic substrates or laminate metals, can be chamfered as disclosed herein without departing from the scope of this disclosure.

With reference now to FIG. 4, the router can form a chamfer in the workpiece to a first depth, e.g., depth D1, and the method can include forming the chamfer to successively greater depths using one or more routers with successively lower router heights relative to the tool body. The router can be a first router that forms the chamfer to the first depth, and the method can include removing the first router from the tool body, mounting a second router to the tool body, and forming the chamfer to a second depth, e.g., depth D2, using the second router with a lower router height than the first router. The method can include removing the second router from the tool body, mounting a third router to the tool body, and forming the chamfer to a third depth, e.g., depth D3, using the third router with a lower router height than the second router. Those skilled in the art will readily appreciate that while described herein in the exemplary context of using three routers to cut three different router depths, any suitable number of routers can be used, and any suitable number of router depths can be cut without departing from the scope of this disclosure.

The chamfer can be a first chamfer and the method can include removing the tool body from the workpiece, flipping the workpiece, as indicated in FIG. 3 by the double arrows, and mounting the tool body to a side of the workpiece opposite the first chamfer, and sliding the router along the tool body with the router forming a second chamfer in the workpiece opposite the first chamfer. The second chamfer can be formed to successively greater depths using one or more routers with successively lower router heights as described above for the first chamfer.

Systems and methods as disclosed herein can be used for repairing a workpiece, e.g., a main blade of a rotorcraft, wherein normal reference features have been trimmed off of the rotor blade being repaired, e.g., as a result of manufacturing, use and/or wear and tear.

The methods and systems of the present disclosure, as described above and shown in the drawings, provide for tools with superior properties including efficiently, accurately, and consistently machine chamfers into workpieces such as main rotor blades or the like, even when wear or use has partially or completely removed reference features from the blades. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of machining a chamfer comprising:
    mounting a tool body having a router port comprising an opening defined by a substantially continuous edge to a root end of a rotor blade using at least two references to positively position the tool body in a fixed position relative to the root end of the rotor blade;
    mounting a router to the tool body, with a router bit extending through the router port defined through the tool body; and
    sliding the router between two rails arranged adjacent to the opening along the tool body relative to the root end of the rotor blade and tool body with the router forming a chamfer in the root end of the rotor blade, wherein mounting the tool body to the root end of the rotor blade includes bolting the tool body to a first bore in the root end of the rotor blade thereof using a first bolt, and bolting the tool body to a second bore in the root end of the rotor blade using a second bolt, wherein the first and second bolts are spaced apart along a longitudinal axis of the root end of the rotor blade.

2. A method as recited in claim 1, wherein the chamfer is formed at an acute angle relative to the longitudinal axis of the rotor blade.

3. A method as recited in claim 1, wherein the router forms the chamfer in the root end of the rotor blade to a first depth, and further comprising forming the chamfer to successively greater depths using one or more routers with successively lower router heights relative to the tool body.

4. A method as recited in claim 3, wherein the router is a first router that forms the chamfer to the first depth, and further comprising removing the first router from the tool body, mounting a second router to the tool body, and forming the chamfer to a second depth using the second router with a lower router height than the first router.

5. A method as recited in claim 4, further comprising removing the second router from the tool body, mounting a third router to the tool body, and forming the chamfer to a third depth using the third router with a lower router height than the second router.

6. A method as recited in claim 1, wherein the chamfer is a first chamfer and further comprising:
    removing the tool body from the root end of the rotor blade;
    flipping the rotor blade and mounting the tool body to a side of the rotor blade opposite the first chamfer; and
    sliding the router along the tool body with the router forming a second chamfer in the root end of the rotor blade opposite the first chamfer.

7. A method as recited in claim 6, wherein the router is a first router that forms the second chamfer to a first depth, and further comprising removing the first router from the tool body, mounting a second router to the tool body, and forming the second chamfer to a second depth using the second router with a lower router height than the first router.

8. A method as recited in claim 7, further comprising removing the second router from the tool body, mounting a third router to the tool body, and forming the second chamfer to a third depth using the third router with a lower router height than the second router.

9. A method as recited in claim 1, wherein forming the chamfer in the root end of the rotor blade includes repairing a rotor blade having reference features which have been removed.

\* \* \* \* \*